No. 765,864. Patented July 26, 1904.

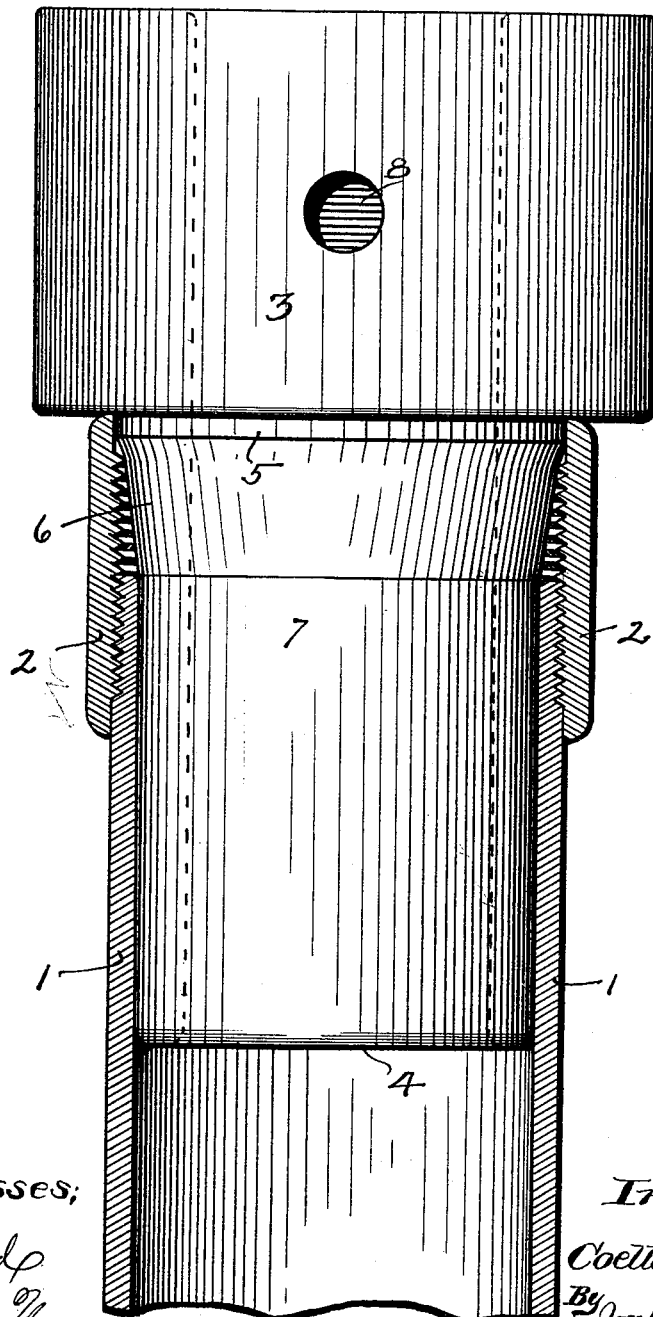

UNITED STATES PATENT OFFICE.

COELLO R. THOMAS, OF HARTFORD CITY, INDIANA.

DRIVE-HEAD.

SPECIFICATION forming part of Letters Patent No. 765,864, dated July 26, 1904.

Application filed February 23, 1904. Serial No. 194,817. (No model.)

*To all whom it may concern:*

Be it known that I, COELLO R. THOMAS, a citizen of the United States, residing at Hartford City, in the county of Blackford and State of Indiana, have invented certain new and useful Improvements in Drive-Heads, of which the following is a specification.

This invention relates to improvements in drive-heads to be used in driving well-tubing; and the object of the invention is to support the inside of the collar at the upper end of the latter, where the driving impact from the head is transmitted, and prevent a bur from being formed by the turning in of the end of the collar, which interferes with the screwing in of the next section of tubing.

I accomplish the object of the invention by the device illustrated in the accompanying drawing, which represents a section of pipe with collar in vertical section and my improved drive-head in operative position therein.

Referring to the drawing, 1 is the top end of the tube or pipe, which is driven down as the drilling proceeds in deep holes, such as oil and gas wells, to form a casing to keep the loose earthy material which is penetrated from caving in. As the drill is operated through the bore of the tubing, the outside dimensions of the latter are necessarily greater than the drilled hole, and the tube is driven down as the drilling proceeds by blows delivered upon its protruding upper end. The pipe is provided with outside screw-threads, whereby an internally-screw-threaded coupling 2 is screwed upon and thereby secured to the end of the tube or pipe 1. Half of the coupling projects above the end of the tubing to receive the next joint of pipe.

3 is a head similar to those heretofore used. It is larger in diameter than the outside diameter of the collar and is held and centered on the collar and pipe by means of the integral shank 4, which in length is approximately twice the width of the collar and extends through the collar down into the end of the tube or pipe 1. These shanks heretofore have been of uniform diameter from the head out, thereby leaving an unfilled space between the shank and collar above the end of the tubing. The collar, as shown in the drawing, has its outside corners rounded, thereby producing a tendency of the collar to curl inwardly under the driving blows administered to it through the head 3, which rests upon it, and because of the open space between the collar and shank there is nothing to resist this tendency of the collar to bend or curl in. As a matter of fact, a very considerable bur is formed in practice on the inside of the collar, and this has to be removed before a new section of pipe can be screwed into the coupling after the lower section has been driven its maximum distance.

Instead of making the shank of uniform diameter in my invention I increase it next to the head so it will completely fill the bore of the collar at the end of the latter, as shown at 5, and I make a gradual taper 6 from this enlargement 5 down to the major portion 7 of the shank, which latter makes a close fit inside of the tube 1. The tapering sides of part 6 drive tightly into the threaded bore of the collar, making a close frictional contact therewith whereby the "jumping" or rebound of the head under each impact of the driving-hammer will be prevented.

The enlargement 5 supports the inner walls of the collar, so as to keep them from turning in, and the tight fit between that part and the tapering portion of the shank prevents the jumping of the head—two very important advantages over the old-style head.

The shank has the usual longitudinal bore, (shown by dotted lines,) which passes through the head for the operation of the drill mechanism, and the head has the transverse hole 8 for the pin, by which the head is raised from the tube by the withdrawal of the drill precedent to the addition of a new section of tubing.

Having thus fully described my invention, what I claim as new, and wish to secure by Letters Patent, is—

1. A pipe, a collar on the end of the pipe, a drive-head bearing upon said collar said head having a shank which passes through the collar and enters the pipe, said shank next to the head being of a diameter next to the head to make a close fit inside of said collar.

2. A pipe, a collar on the end of the pipe, a drive-head bearing upon said collar said head having a shank which passes through the collar and enters the pipe, said shank next to the head being of greater diameter next to the head to make a close fit in the end of said collar and of less diameter to enter the pipe and having a tapering formation between the two diameters.

3. A drive-head, a shank of less diameter than the head and a tapering formation adjacent to the head.

4. A drive-head, a shank of less diameter than the head having a tapering formation adjacent to said head and a cylindrical portion between the head and said tapering portion of less diameter than the head and of greater diameter than the shank.

In witness whereof I have hereunto set my hand and seal, at Indianapolis, Indiana, this 4th day of February, A. D. 1904.

COELLO R. THOMAS. [L. S.]

Witnesses:
    JOHN B. SHERWOOD,
    JAS. A. MINTURN.